(12) United States Patent
Kim et al.

(10) Patent No.: US 12,528,070 B2
(45) Date of Patent: Jan. 20, 2026

(54) VISIBLE LIGHT-REACTIVE PHOTOCATALYST FOR TREATING ORGANIC POLLUTANTS

(71) Applicant: KYUNGPOOK NATIONAL UNIVERSITY INDUSTRY-ACADEMIC COOPERATION FOUNDATION, Daegu (KR)

(72) Inventors: Woong Kim, Daegu (KR); Chang-Hyun Jeon, Daegu (KR); Govarthanan Muthusamy, Daegu (KR)

(73) Assignee: KYUNGPOOK NATIONAL UNIVESITY INDUSTRY-ACADEMIC COOPERATION FOUNDATION, Daegu (KR)

( * ) Notice: Subject to any disclaimer, the term of this patent is extended or adjusted under 35 U.S.C. 154(b) by 458 days.

(21) Appl. No.: 18/120,152

(22) Filed: Mar. 10, 2023

(65) Prior Publication Data
US 2023/0285934 A1 Sep. 14, 2023

(30) Foreign Application Priority Data

Mar. 11, 2022 (KR) .................. 10-2022-0030409

(51) Int. Cl.
| | | |
|---|---|---|
| *B01J 20/22* | (2006.01) | |
| *B01J 27/051* | (2006.01) | |
| *B01J 35/39* | (2024.01) | |
| B01J 35/30 | (2024.01) | |
| B01J 35/70 | (2024.01) | |

(52) U.S. Cl.
CPC .......... *B01J 20/226* (2013.01); *B01J 27/051* (2013.01); *B01J 35/39* (2024.01); *B01J 35/30* (2024.01); *B01J 35/70* (2024.01); *B01J 2235/00* (2024.01); *B01J 2235/10* (2024.01); *B01J 2235/15* (2024.01); *B01J 2235/30* (2024.01)

(58) Field of Classification Search
None
See application file for complete search history.

(56) References Cited

U.S. PATENT DOCUMENTS

2018/0311655 A1* 11/2018 Thuo .................. B01J 23/08

FOREIGN PATENT DOCUMENTS

| CN | 103240130 A | * | 8/2013 | |
|---|---|---|---|---|
| CN | 104475028 A | * | 4/2015 | ............... C02F 1/00 |
| CN | 109482241 A | * | 3/2019 | .......... B01J 31/1691 |
| JP | 2009-078264 A | | 4/2009 | |

(Continued)

OTHER PUBLICATIONS

CN-103240130-A—English translation (Year: 2013).*

(Continued)

*Primary Examiner* — Stefanie J Cohen
(74) *Attorney, Agent, or Firm* — Bridgeway IP Law Group, PLLC; Sang Ho Lee; Hyun Woo Shin

(57) ABSTRACT

A visible light-reactive photocatalyst includes: a metal-organic framework (MOF) including pores; and an active material doped on the surface of the metal-organic framework, wherein the active material includes molybdenum disulfide ($MoS_2$) or titanium oxide ($TiO_2$).

5 Claims, 15 Drawing Sheets

(56) References Cited

FOREIGN PATENT DOCUMENTS

| KR | 10-2176682 | B1 | | 11/2020 | |
|----|------------|-----|---|---------|---|
| KR | 10-2303901 | B1 | | 9/2021 | |
| WO | 2018/197715 | A1 | | 11/2018 | |
| WO | WO-2019038607 | A1 | * | 2/2019 | .............. B01J 35/45 |

OTHER PUBLICATIONS

CN-104475028-A, English translation (Year: 2015).*
CN-109482241-A, English translation (Year: 2019).*
Vigneshwaran et al, Immobilization of MIL-88(Fe) anchored TiO2-chitosan(2D/2D) hybrid nanocomposite for the degradation of organophosphate pesticide: Characterization, mechanism and degradation intermediates, journal of hazardous materials, Dec. 2020 (Year: 2020).*
Govarthanan et al, Facile fabrication of (2D/2D) MoS2@MIL-88(Fe) interface-driven catalyst for efficient degradation of organic pollutants under visible light irradiation, journal of hazardous materials, Mar. 5, 2021 (Year: 2021).*
Roy, Debashis et al., "Mechanistic investigation of photocatalytic degradation of Bisphenol-A using MIL-88A(Fe)/MoS2 Z-scheme heterojunction composite assisted peroxymonosulfate activation", Chemical Engineering Journal, 2022, vol. 428, 131028.

* cited by examiner

VISIBLE LIGHT-REACTIVE PHOTOCATALYST FOR TREATING ORGANIC POLLUTANTS

CROSS-REFERENCE TO RELATED APPLICATION

This application claims priority under 35 USC 119 to Korean patent application No. 10-2022-0030409 filed on Mar. 11, 2022, the disclosure of which is hereby incorporated by reference herein.

BACKGROUND

1. Field

The present disclosure relates to a visible light-reactive photocatalyst for treating organic pollutants.

2. Description of the Related Art

With the increase in world population and modern industrialization, main standards are being established for environmental pollution. Particularly, water pollutants such as organic and inorganic pollutants have garnered a lot of attention in recent centuries in scientific fields as an important threat to our surrounding environment. Especially, many colorant compounds are widespread directly or indirectly in the aqueous environment due to illegal use in the dye industry. It is necessary to reduce the concentration of dyes in wastewater as much as possible because the colorants can induce carcinogenic effect in organisms including organs such as the bladder, kidney, liver, and central nervous system even at insignificant concentrations, and many of them are highly toxic and are not degraded naturally.

Dye molecules having complicated aromatic structure are very stable and cause various types of diseases in the surrounding environment. Recently, they are removed by technical processes such as adsorption, chemical oxidation, ozonization, coagulation, membrane process, biological degradation, electrochemical process, photocatalytic degradation, etc. Among these conventional technologies, degradation using a photocatalyst is one of the most environment-friendly strategic approaches. Due to the high degradation ability, wide applicability, and recyclability of the photocatalyst, it is utilized widely for mineralization of organic dyes in wastewater through proper light irradiation.

Organic dyes can be converted to completely unharmful materials such as water, carbon dioxide, and minerals. A variety of metal oxides such as zinc oxide (ZnO), titanium dioxide ($TiO_2$), etc. are used as photocatalysts for this purpose. However, although $TiO_2$ and ZnO can be successfully used as photocatalysts in the UV region owing to wide band gaps, they hardly absorb visible light due to surface defects.

It has been reported recently that 2D materials such as molybdenum disulfide ($MoS_2$) can replace the metal oxides such as $TiO_2$ and ZnO owing to superior properties such as strong oxidizing power, large surface area, superior chemical property, etc.

In particular, $MoS_2$ can easily absorb visible light because it has an appropriate band gap of 1.9 eV. However, it cannot be used for photodegradation reactions on its own due to low operability in the visible region owing to the fast recombination of electron-hole ($e^-$ and $h^+$) pairs. Therefore, it is one of the important issues to increase the efficiency of the $MoS_2$ photocatalyst.

SUMMARY

In an aspect, the present disclosure is directed to solving the problem of difficulty of operation of the existing photocatalysts for degrading organic dyes, which consist of metal oxides having wide band gaps such as zinc oxide (ZnO), titanium dioxide ($TiO_2$), etc., in the visible region.

In addition, the present disclosure is directed to solving the problem of 2D materials such as molybdenum disulfide ($MoS_2$), which can absorb light not only in the UV range but also in the visible region, that they cannot be used on their own in the visible region due to decreased energy efficiency caused by fast recombination of electron-hole ($e^-$ and $h^+$) pairs.

In order to solve these problems, the present disclosure provides a visible light-reactive photocatalyst including: a metal-organic framework (MOF) including pores; and an active material doped on the surface of the metal-organic framework, wherein the active material includes molybdenum disulfide ($MoS_2$) or titanium oxide ($TiO_2$).

The photocatalyst prepared from a hybrid composite material obtained by doping an active material on a metal-organic framework (MOF) by a solvothermal method may have superior photodegradation efficiency for organic dyes in the visible region.

DETAILED DESCRIPTION

Figure 1A:
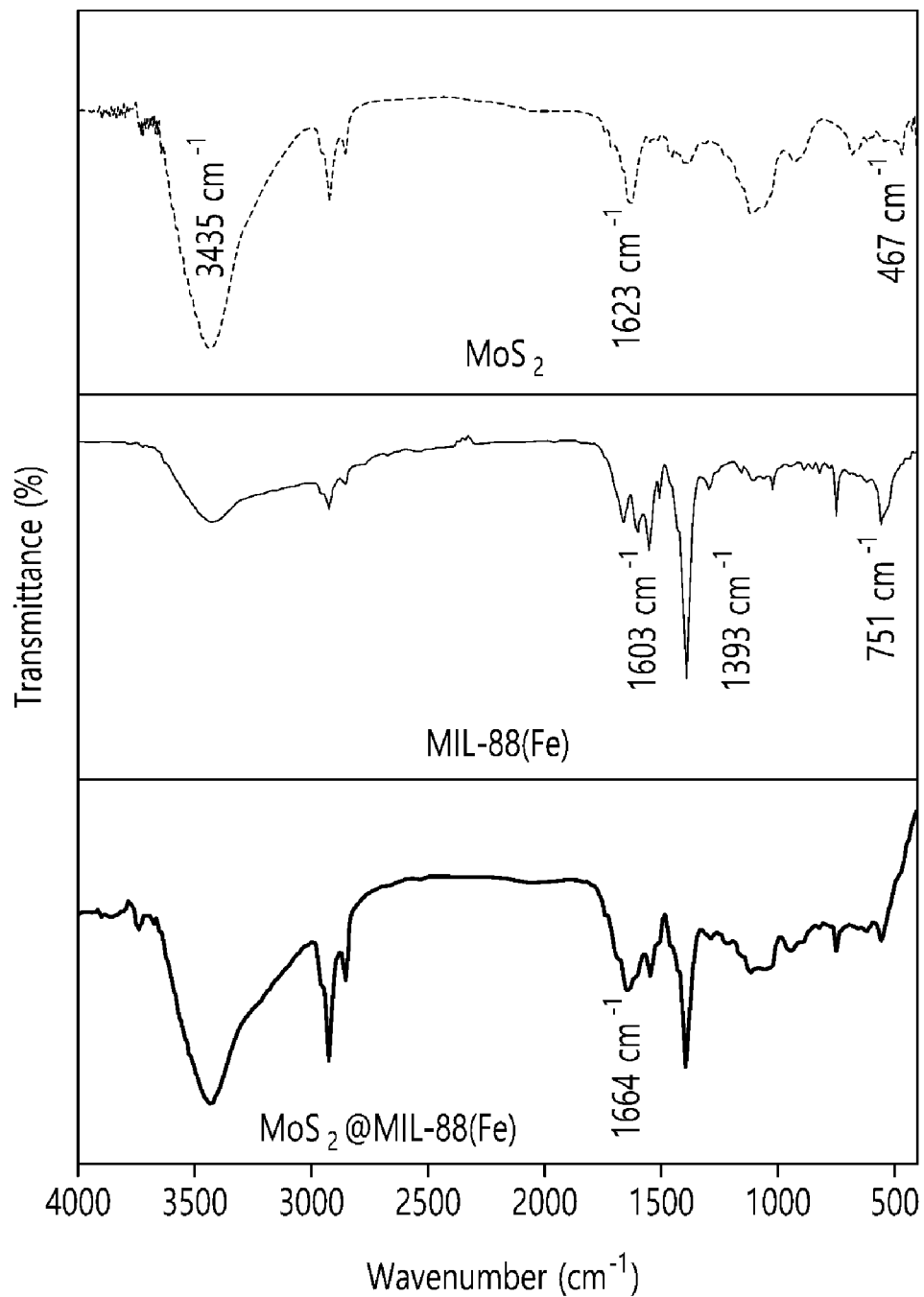
FIG. 1A compares the FTIR analysis result for photocatalyst samples of Examples 1-3 according to the present disclosure.

Hereinafter, exemplary embodiments of the present disclosure will be described in more detail.

The exemplary embodiments described in the present specification are provided only for the purpose of illustration. The exemplary embodiments of the present disclosure may be embodied in various forms and the present disclosure is not limited to the exemplary embodiments.

The present disclosure may be changed variously and may have various exemplary embodiments. It should be understood that the present disclosure is not limited by the specific exemplary embodiments but includes all changes, equivalents and substitutes encompassed within the technical idea and scope of the present disclosure.

Singular expressions include plural expressions unless the context clearly indicates otherwise. In the present application, it is to be understood that terms such as "include", "have", etc. are intended to indicate that there is a feature, number, step, operation, component, part or combination thereof described in the specification, and not to exclude the presence or the possibility of addition of one or more other features, numbers, steps, operations, components, parts or combinations thereof.

Visible Light-Reactive Photocatalyst

In an exemplary embodiment, the present disclosure provides a visible light-reactive photocatalyst including: a metal-organic framework (MOF) including pores; and an active material doped on the surface of the metal-organic framework, wherein the active material includes molybdenum disulfide ($MoS_2$) or titanium oxide ($TiO_2$).

In an exemplary embodiment, the visible light-reactive photocatalyst may be prepared by a solvothermal method. By uniformly distributing the dopant such as molybdenum disulfide ($MoS_2$), etc. on the metal-organic framework (MOF) using the solvothermal method, a new energy level may be generated between the conduction band (CB) and valence band (VB) of $MoS_2$. Specifically, the active material and the metal-organic framework may have a (p-n) heterojunction.

In an exemplary embodiment, the metal-organic framework may have a next-generation porous crystal structure wherein an inorganic metal and an organic linker are bonded through coordination. Particularly, since iron (Fe) has low toxicity and high biocompatibility, an Fe-based MOF may be preferred for photodegradation of organic dyes.

In an exemplary embodiment, the metal-organic framework may have a porous structure, and the porous structure may allow high dispersion of $MoS_2$. Owing to the large surface area of the porous structure, the transition metal of the MOF may function as a good cocatalyst and improve photocatalytic efficiency by binding to $MoS_2$ during photodegradation.

In an exemplary embodiment, the active material may be doped on the surface of the metal-organic framework. Visible light-absorbing ability and visible light responsiveness may be conferred through the doping.

In an exemplary embodiment, the metal-organic framework may include one or more selected from a group consisting of MIL-88, MIL-101(Fe) and MIL-53(Fe). The metal-organic framework may function as a carbon dioxide-reducing photocatalyst.

In an exemplary embodiment, the metal-organic framework may be MIL-88(Fe) and the active material may be molybdenum disulfide ($MoS_2$). When visible light is irradiated, the molybdenum disulfide ($MoS_2$) can degrade pollutants by photodissociating water and generating OH radicals with strong oxidizing power. At the same time, electrons generated from the molybdenum disulfide ($MoS_2$) can block the recombination of electrons and holes as they are migrated to the metal-organic framework. Through this, a superior efficiency of degrading organic dyes may be achieved. Accordingly, the photocatalyst according to an exemplary embodiment of the present disclosure, which is a hybrid composite of molybdenum disulfide ($MoS_2$) and MIL-88(Fe), may have superior photocatalytic activity as compared to pristine $MoS_2$ or MIL-88(Fe) framework.

In an exemplary embodiment, when the n-type molybdenum disulfide ($MoS_2$) and the p-type MIL-88(Fe) contact with each other, a (p-n) heterojunction with a new band structure may be formed through recombination of the Fermi levels of the two semiconductors.

In an exemplary embodiment, the weight ratio of metal-organic framework:active material may be in a range of 20:80 to 40:60. When the weight ratio is smaller than 20:80 (i.e., when the active material is in excess), the doping may be incomplete. And, when the weight ratio exceeds 40:60, the catalytic activity may be decreased.

In an exemplary embodiment, the photocatalyst may have a band gap energy of 2.70-2.80 eV. For example, it may have a band gap energy of 2.75 eV. An optimized photocatalytic efficiency may be achieved when the band gap energy is within the above range.

In an exemplary embodiment, the photocatalyst may facilitate the photodegradation reaction of an organic material including one or more of methylene blue (MB) and rhodamine B (RhB). The organic materials may be degraded by nontoxic byproducts generated by the photocatalyst, such as hydroxyl (OH) and superoxide (0-2) species.

In an exemplary embodiment, the photocatalyst may facilitate the photodegradation reaction of an organic material at pH 4.5-5.5. Superior photodegradation efficiency may be achieved in the above-described pH range. For example, 98% or more of the organic dye may be degraded within 1 hour at pH 5.0.

Hereinafter, the present disclosure will be described more specifically through examples. However, the examples are provided only for helping the understanding of the present disclosure and the category and scope the present disclosure are not limited by the examples.

[Example 1] Preparation of MIL-88(Fe) Framework

MOF(MIL-88(Fe)) was prepared by solvothermal one-step synthesis.

First, after dissolving about 3 mmol of BDC, 4.5 mmol of $FeCl_3 \cdot 6H_2O$ and 9 mmol of DMF in 60 mL of an ethanol/water solvent, the mixture solution was stirred for 1 hour. Then, the stirred mixture was transferred to a Teflon-lined 100-mL digester and maintained at 120° C. for 6 hours. After collecting the precipitate and removing excess reactants and impurities by washing several times with ethanol and DMF, the product was cooled naturally at room temperature. Finally, a MIL-88(Fe) framework was prepared as a brown solid by drying in a convection oven at 80° C. for 6 hours.

[Example 2] Preparation of $MoS_2$

After dissolving 1.06 g of $(NH_4)_6Mo_7O_{24} \cdot 4H_2O$ and 2.0 g of $CH_4N_2S$ in 40 mL of Milli-Q water, a homogeneous mixture was obtained by stirring the mixture solution for 30 minutes. Excess unreacted particles were removed by washing the produced suspension several times with water and ethanol. Then, the mixture was transferred to a Teflon-lined muffle furnace and dried at 180° C. for 12 hours. After cooling to room temperature, the product was washed with water and ethanol, and the obtained $MoS_2$ was dried in vacuo at 90° C. for 12 hours.

[Example 3] Preparation of $MoS_2$@MIL-88(Fe)

The MIL-88(Fe) MOF of Example 1 and the $MoS_2$ of Example 2 were dispersed in 50 mL of ethanol through sonication, and a homogeneous mixture was obtained by stirring at 60° C. for 1 hour. Then, the mixture was cooled to room temperature and the final product was washed with ethanol. The $MoS_2$@MIL-88(Fe) obtained in the form of a black solid was dried at 60° C. for 2 hours.

[Test Example 1] Characterization of Photocatalyst 1-1. FTIR Spectra

FIG. 1A shows the FTIR spectra of the MIL-88(Fe) of Example 1, the $MoS_2$ of Example 2 and the $MoS_2$@MIL-88(Fe) of Example 3. The characteristics of the samples of the examples were analyzed by Fourier-transform infrared spectroscopy (FTIR) and KBr pellet technique in the range of 4000-400 $cm^{-1}$ (JASCO-460 Plus, Japan).

First, for the MIL-88(Fe) of Example 1, the presence of —NH stretching vibration of an amino group was verified from the broad absorption peak at 3428 $cm^{-1}$. The sharp peaks at 1603 $cm^{-1}$ and 1393 $cm^{-1}$ are attributable to the asymmetric and symmetric stretching vibration modes of carboxyl groups, which suggests the presence of a dicarboxylate linker in the MIL-88(Fe) MOF. In addition, the bands at 1664 $cm^{-1}$ and 751 $cm^{-1}$ correspond to the stretching vibrations of C=O and —CH bonds in the MOF, and the characteristic peak at 548 $cm^{-1}$ corresponds to the Fe—O bending vibration in the MIL-88(Fe), suggesting the coordination between BDC and Fe(III) ion in the MOF.

The FTIR spectrum of the $MoS_2$ of Example 2 show broad and sharp peaks at 3435 cm-1 and 1623 $cm^{-1}$ owing to —OH starching and adsorbed water, and the band at 467 $cm^{-1}$ corresponds to the S—S bond of $MoS_2$.

The FTIR spectrum of the $MoS_2$@MIL-88(Fe) of Example 3 shows the major absorption peaks of the $MoS_2$ and the MIL-88(Fe). It was confirmed that the $MoS_2$@MIL-88(Fe) has the characteristic peaks of the two components even after the preparation of the hybrid catalyst.

It was confirmed from the FTIR spectrum analysis that $MoS_2$ was effectively doped in the MIL-88(Fe) MOF. In addition, the change in peak intensity and frequency shift in the $MoS_2$@MIL-88(Fe) indicate the strong chemical interaction between $MoS_2$ and the MIL-88(Fe) catalyst.

1-2. PXRD Patterns

Figure 1B:
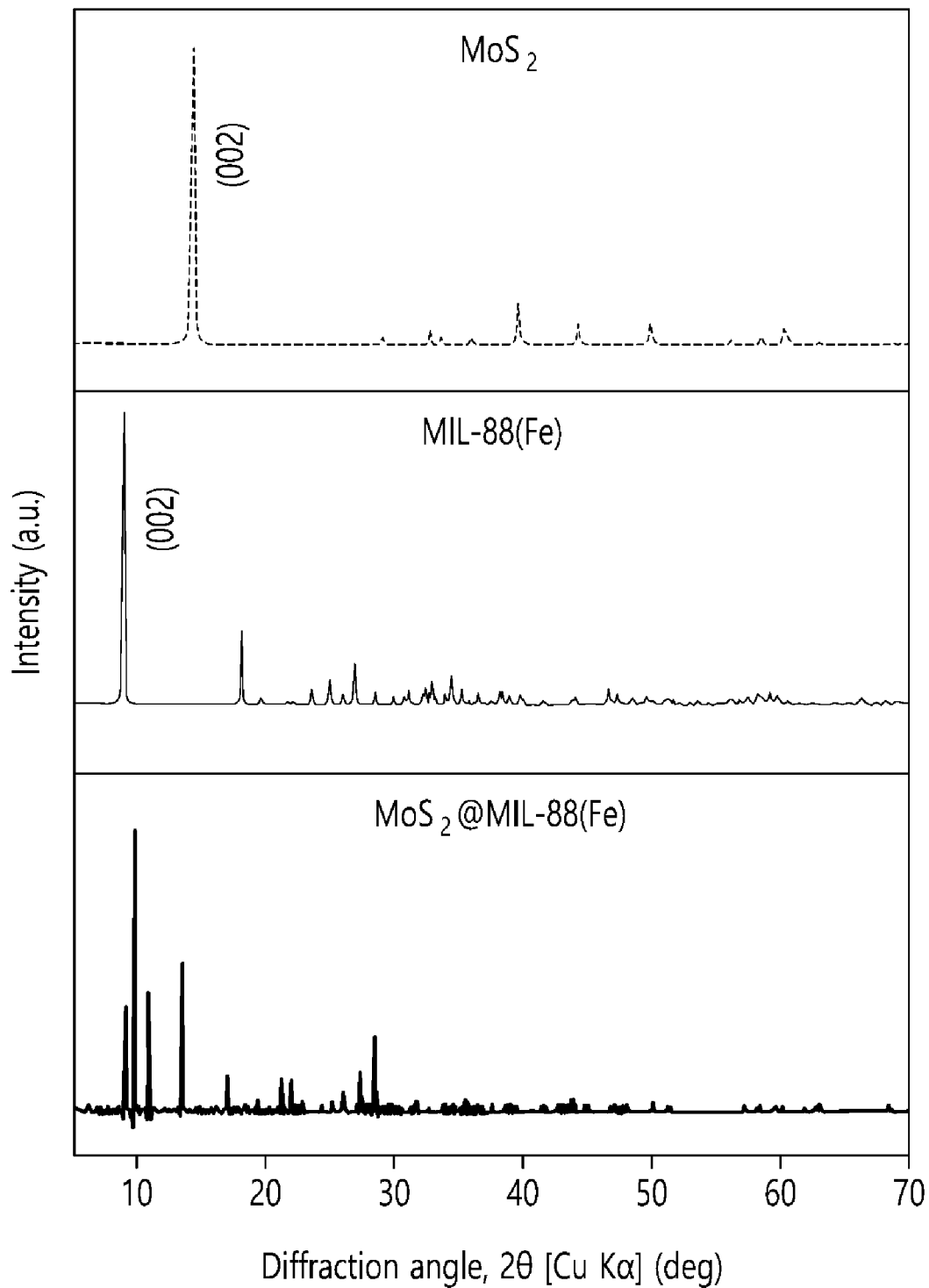
FIG. 1B compares the PXRD analysis result for photocatalyst samples of Examples 1-3 according to the present disclosure.

FIG. 1B shows the PXRD diffraction patterns of $MoS_2$, MIL-88(Fe) and the $MoS_2$@MIL-88(Fe) composite. Crystallographic data measured with a powder X-ray diffractometer (PXRD, Rigaku, D/Max-2500, Japan) at a scan rate of 0.2° $min^{-1}$ using Cu-Kα radiation were analyzed.

First, a high-intensity sharp peak was observed at $2\theta=9.09°$ in the PXRD spectrum of the MIL-88(Fe) framework correspond to the (002) plane. It is consistent with the value reported in the literature and indicates that MIL-88 (Fe) was prepared as expected.

In addition, peaks with weak intensities were observed at $2\theta=18.22°$, 25.07°, 26.87° and 34.27° in the PXRD spectrum of MIL-88(Fe), indicating the high crystallinity of the MOF. Furthermore, peaks with weak intensities were observed at higher 2θ during the synthesis of the MIL-88 (Fe) framework, which are contributable to the iron precursor and solvent used, maintenance of temperature during the synthesis, etc. The sharp $MoS_2$ peak in the (002) plane at 2θ=14.520 corresponds to about 6.1004 A°° and indicates that $MoS_2$ was synthesized successfully.

The characteristic peaks of $MoS_2$ and MIL-88(Fe) are also observed in the PXRD spectrum of the $MoS_2$@MIL-88(Fe) sample but with decreased peak intensities, which suggests that $MoS_2$ was dispersed well in the MOF after the synthesis of the $MoS_2$@MIL-88(Fe) catalyst. Accordingly, superior dispersion characteristics were confirmed as in the foregoing FTIR analysis result.

1-3. SEM and HR-TEM Analysis

The surface morphology and microstructure of the samples of Examples 1-3 were observed by SEM and HR-TEM at different magnifications. SEM was conducted by energy-dispersive X-ray spectroscopy (EDX, Bruker Nano Gmbh, Germany), and the structural images of the photocatalyst were analyzed by high-resolution transmission electron microscopy (HR-TEM, JEOL (JEM-2100F), Japan).

Figure 2:
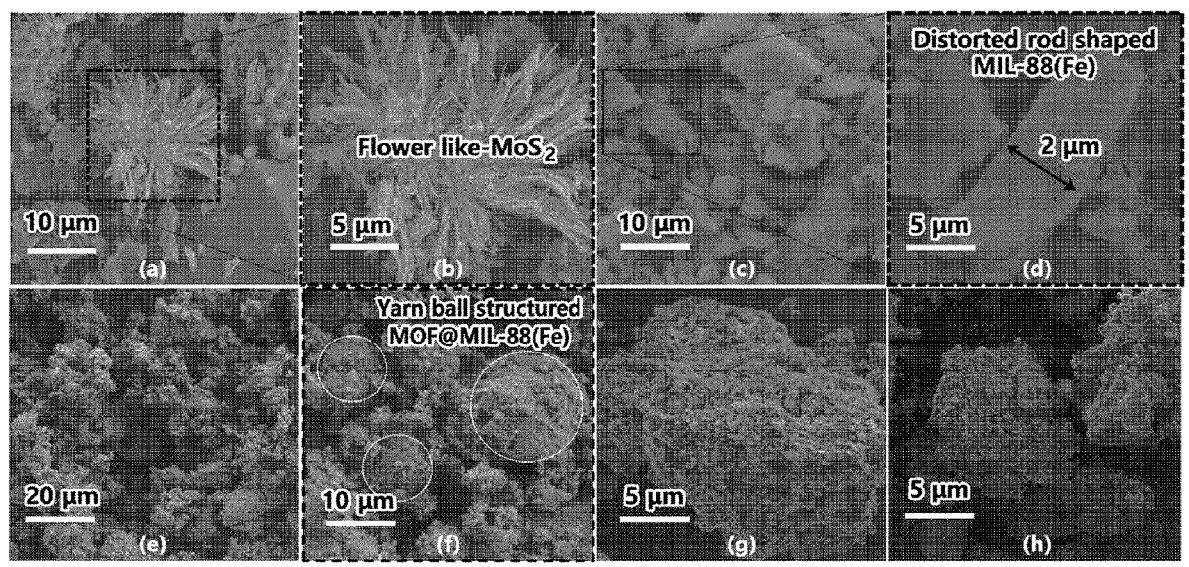
FIG. 2 shows (a) and (b) the SEM images of a $MoS_2$ sample of Example 2 according to the present disclosure, (c) and (d) the SEM images of a MIL-88(Fe) sample of Example 1 according to the present disclosure, and (e)-(h) the SEM images of a $MoS_2$@MIL-88(Fe) sample of Example 3 according to the present disclosure.

From FIGS. 2 (A) and (B), it can be seen that $MoS_2$ has a flower-like 3D structure formed by clustering of lamellar structures due to sulfide-sulfide bonding through weak van der Waals force. MIL-88(Fe) shows the shape of a distorted rod due to 2D assembly as shown in (C) and (D). It can be seen that wide thin rods are spaced with regular intervals.

The high-magnification image of FIG. 2 (E) shows that $MoS_2$ is fixed on the MOF randomly assembled as a yarn-ball structure having many regularly arranged single layers, which provides many porous active sites and thereby improves catalytic performance.

Figure 3:
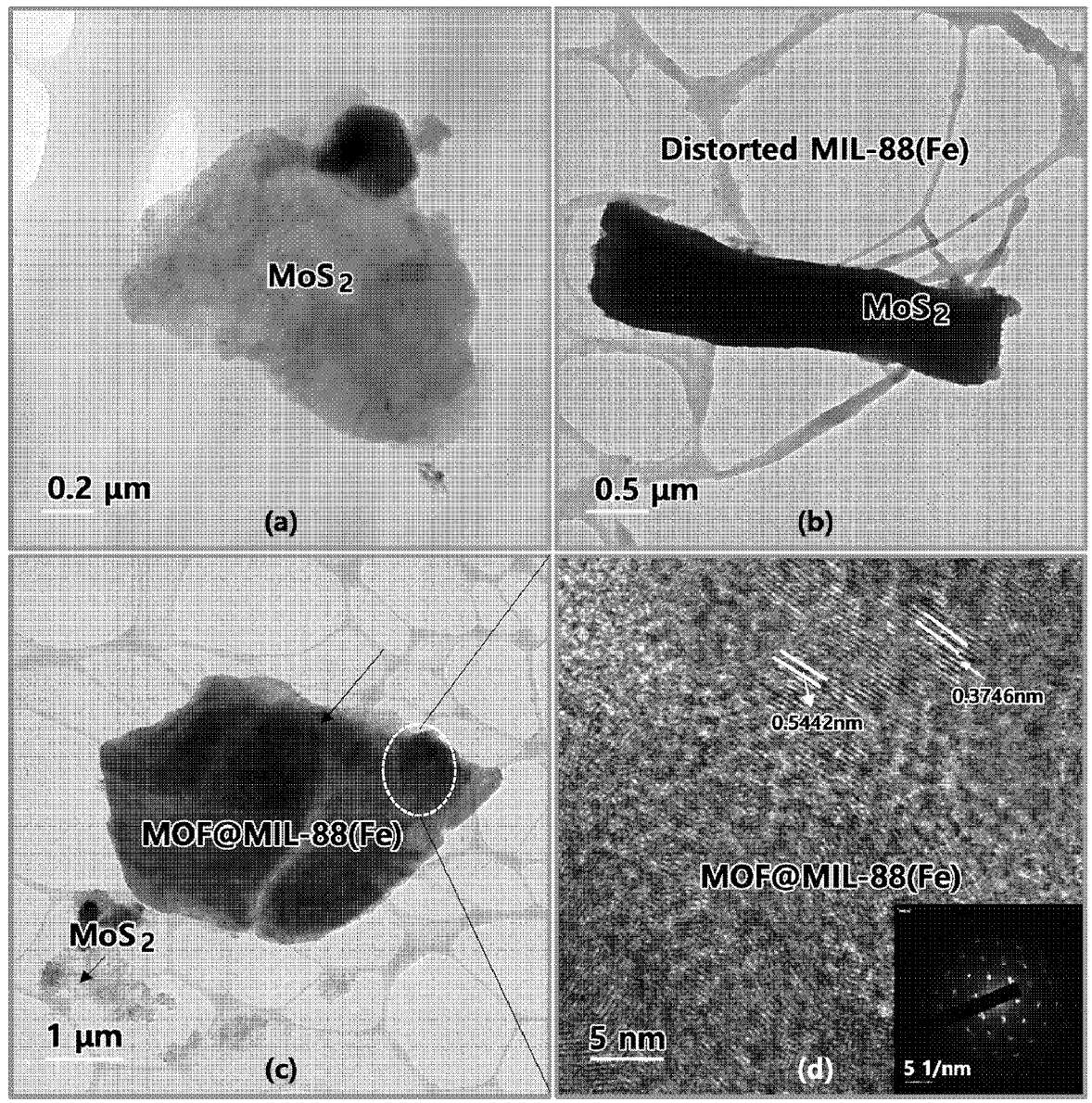
FIG. 3 shows (a) the HR-TEM image of a $MoS_2$ sample of Example 2 according to the present disclosure, (b) the HR-TEM image of a MIL-88(Fe) sample of Example 1 according to the present disclosure, and (c) and (d) the HR-TEM images of a $MoS_2$@MIL-88(Fe) sample of Example 3 according to the present disclosure.

FIG. 3 (A)-(D) show the HR-TEM profiles of $MoS_2$, MIL-88(Fe), $MoS_2$@MIL-88(Fe) and $MoS_2$@MIL-88(Fe). FIG. 3 (A) shows the transparent layer that defines the small thickness of $MoS_2$. FIG. 3 (B) shows the wrinkles and distorted rod-shaped structure of the MIL-88(Fe) framework, which are consistent with the SEM analysis result (FIG. 2 (D)).

The $MoS_2$@MIL-88(Fe) catalyst material shows distinct change on the surface. As shown in FIG. 3 (C), a thin layer of the $MoS_2$ flower sheet is fixed and dispersed densely on the MIL-88(Fe) surface, indicating that $MoS_2$ was successfully arranged on the MOF material.

From FIG. 3 (D), it can be seen that MOF and $MoS_2$ have interplanar spacings of 0.3746 and 0.5442 nm, respectively, consistently with the XRD result.

1-4. TGA Analysis

In order to investigate the thermal stability of the binary catalyst materials of the examples, thermogravimetric analysis was performed in a temperature range of 25-800° C. under $N_2$ atmosphere (TGA, SDT Q600 V8.3 model, Delaware, USA).

Figure 4:
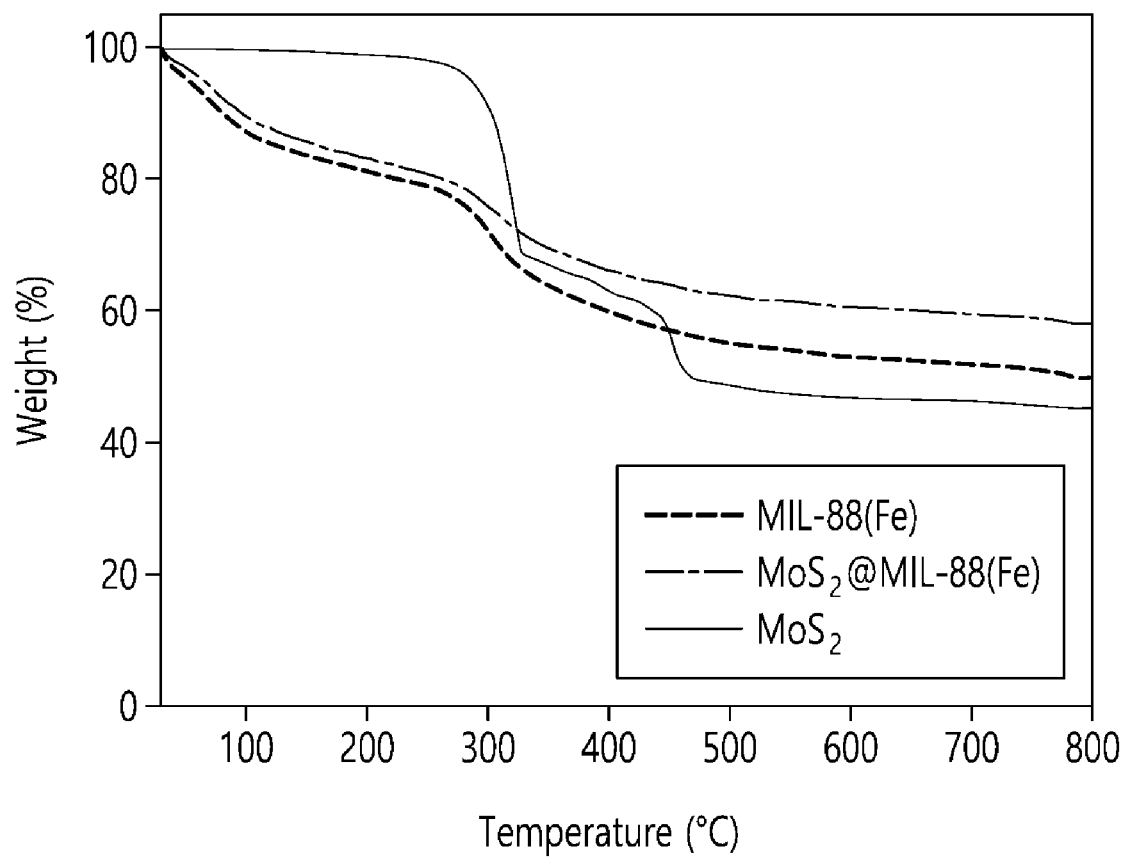
FIG. 4 compares the TGA analysis result for samples of Examples 1-3 according to the present disclosure.

As seen from FIG. 4, critical mass loss was observed in all the examples in the TGA profiles from 25° C. to 200° C. because of the evaporation of physically adsorbed water and other volatile substances.

$MoS_2$ showed unexpected weight loss around 380° C., which indicates phase transition of $MoS_2$. The weight loss of 46.5% until 800° C. shows that $MoS_2$ was oxidized to $MoO_3$.

MIL-88(Fe) showed weight loss at 200-480° C. and 490-800° C., which is due to the degradation of the MOF framework and the organic linker, respectively.

The MoS$_2$@MIL-88(Fe) catalyst showed major weight loss of about 22% only in the range from 277 to 800° C., owing to the structural destruction of the catalyst material. As can be seen from the TGA curve, the synthesized catalyst was thermally stable and maintained the MoS$_2$@MIL-88 (Fe) framework up to 800° C.

1-5. UV-DRS Spectrum Analysis

Figure 5:
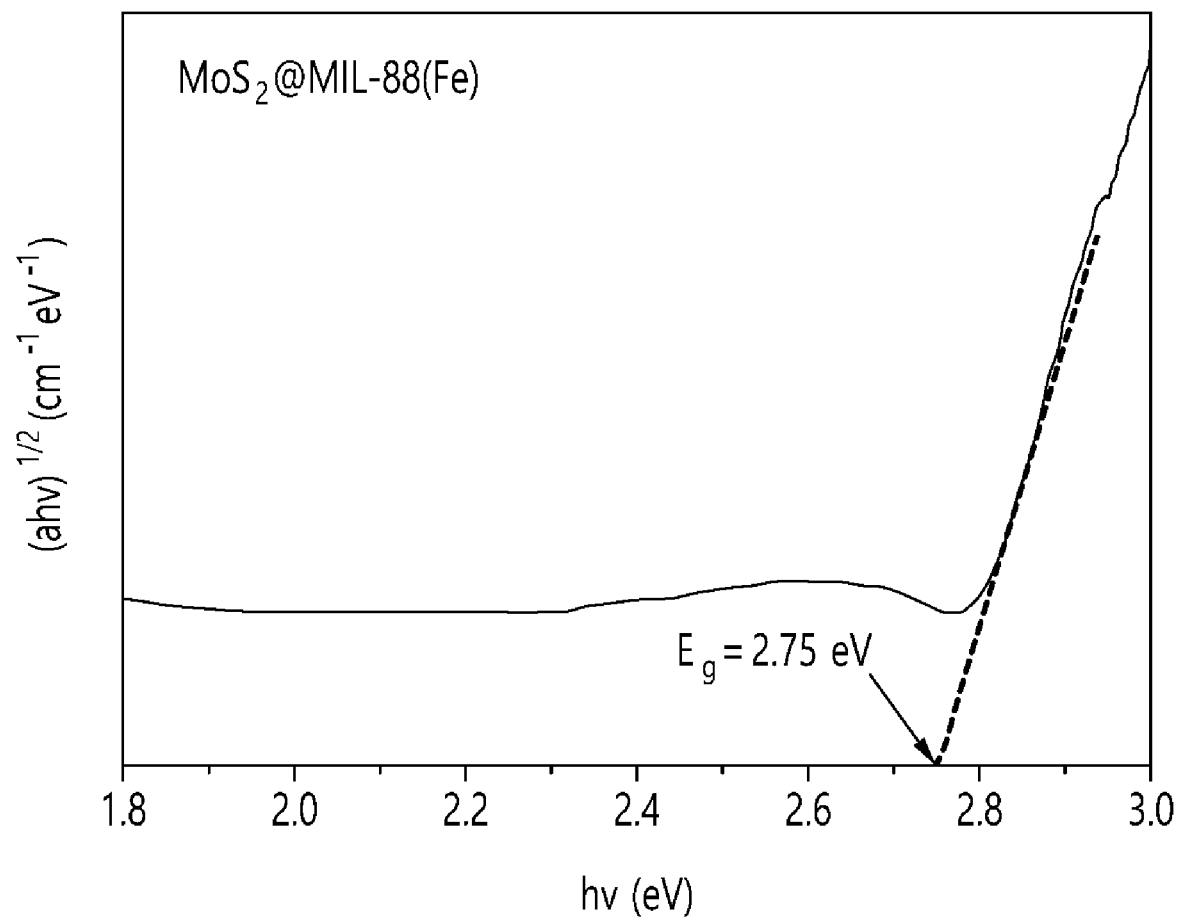
FIG. 5 shows the UV-vis DRS spectrum of a $MoS_2$@MIL-88(Fe) sample of Example 3 according to the present disclosure.

The band gap and optical characteristics of the examples were investigated by UV-vis diffuse reflectance spectroscopy (JASCO V-550, Merck, Germany). FIG. 5 shows the UV-DRS spectrum of the MoS$_2$@MIL-88(Fe) catalyst.

The band gap energy of the MoS$_2$@MIL-88(Fe) catalyst was determined by the following Tauc equation.

$$(\alpha h\nu)^{n/2} = A(h\nu - E_g) \quad \text{Equation 1}$$

In the equation, α is the absorption coefficient, hν is the photon energy, A is a constant, $E_g$ is the band gap energy and n is an integer. The band gap energy was determined by plotting $(\alpha h\nu)^{1/2}$ versus hν. As a result, the band gap energy of the MoS$_2$@MIL-88(Fe) catalyst was calculated as 2.75 eV. This narrow band gap allows photocatalytic activity for MB and RhB when visible light is irradiated.

1-6. Photoluminescence Analysis

Figure 6:
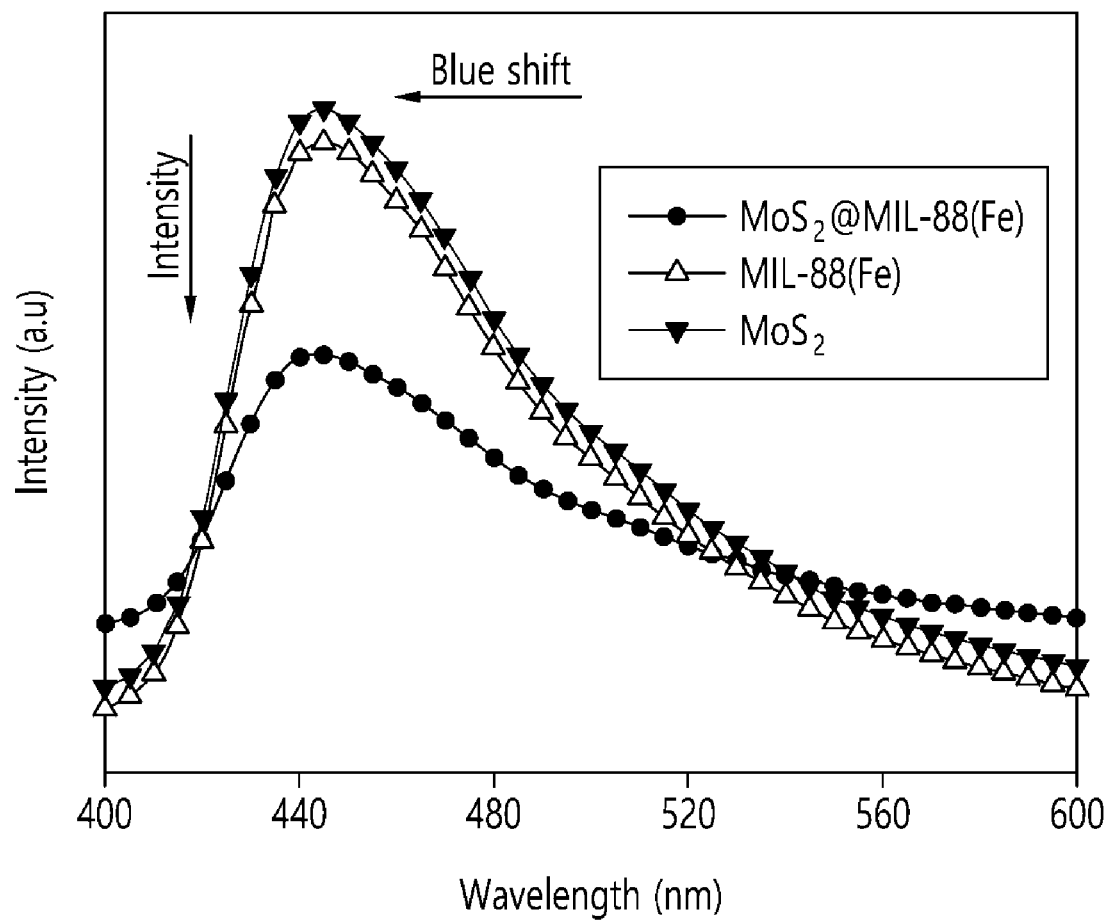
FIG. 6 compares the PL spectra of samples of Examples 1-3 according to the present disclosure.

The recombination of photogenerated electron-hole (e$^-$-h$^+$) pairs is an important factor that affects the rate of a photocatalytic reaction, and the intensity of photoluminescence (PL) determines the recombination rate of charge carriers. The fast recombination of e$^-$-h$^+$ pairs, which is the biggest weakness of MoS$_2$, was reduced by forming a heterojunction. That is to say, the intensity of MoS$_2$@MIL-88(Fe) was decreased significantly as compared to pristine MoS$_2$, as shown in the PL spectra of FIG. 6.

Whereas a broad peak was observed at 445 nm in the PL spectrum of the MIL-88(Fe) framework, a blue-shifted peak (442 nm) was observed for MoS$_2$@MIL-88(Fe). In addition, the PL intensity was decreased significantly for MoS$_2$@MIL-88(Fe), which is associated with improved trapping that reduces the radiative recombination of photoinduced charge carriers.

[Test Example 2] Analysis of Photocatalytic Performance 2-1. Identification of Active Species Quantitative experiment was conducted to identify active species. About 10 mg of the MoS$_2$@MIL-88(Fe) catalyst was uniformly dispersed in 10 mL of Milli-Q water by stirring. Then, SO$_4^{2-}$ was removed by adding various scavengers (10 μL) such as isopropyl alcohol (IPA), 5,5-dimethyl-1-pyrroline N-oxide (DMPO), benzoquinone (BQ) and ethylenediaminetetraacetic acid (EDTA), and ·OH, ·O$_2^+$ and h$^+$ species were removed as MB and RhB dyes were degraded.

Figure 7A:
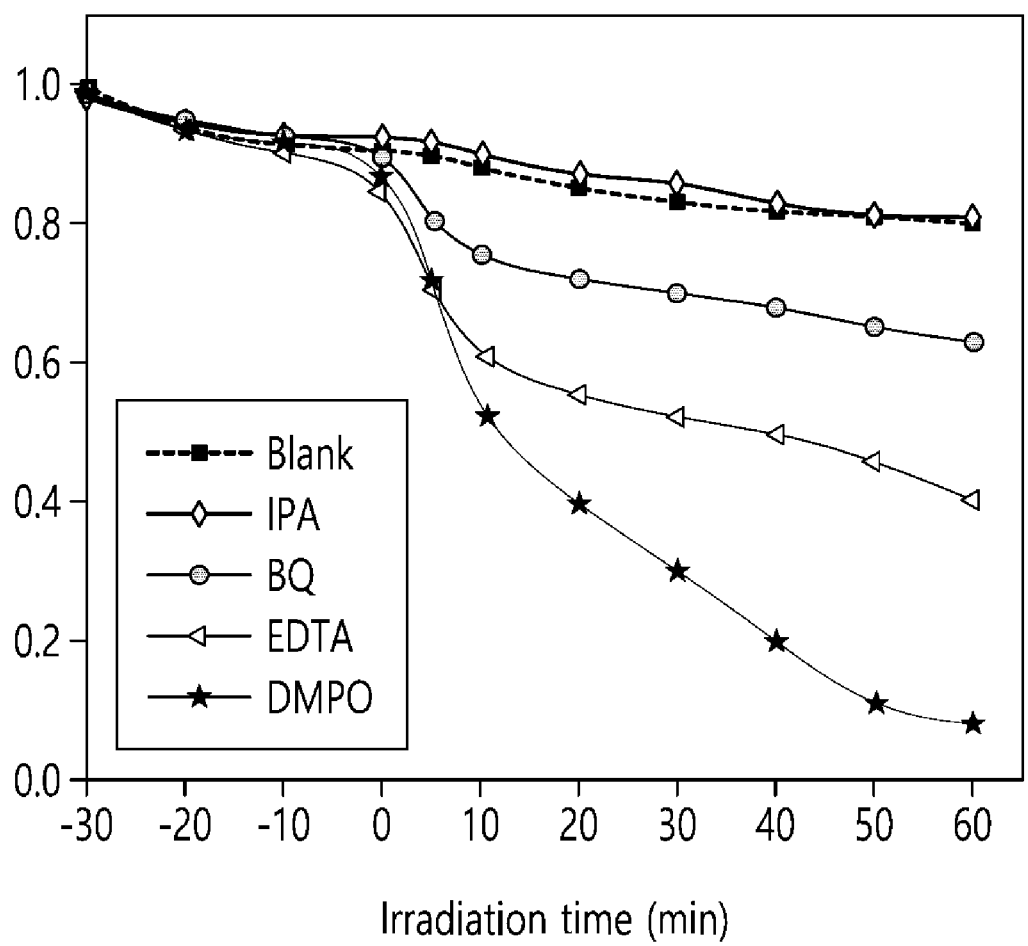
FIGS. 7A and 7B plot photogenerated carriers trapped in MB and RhB photodegradation systems using a $MoS_2$@MIL-88(Fe) sample of Example 3 according to the present disclosure.
Figure 7B:
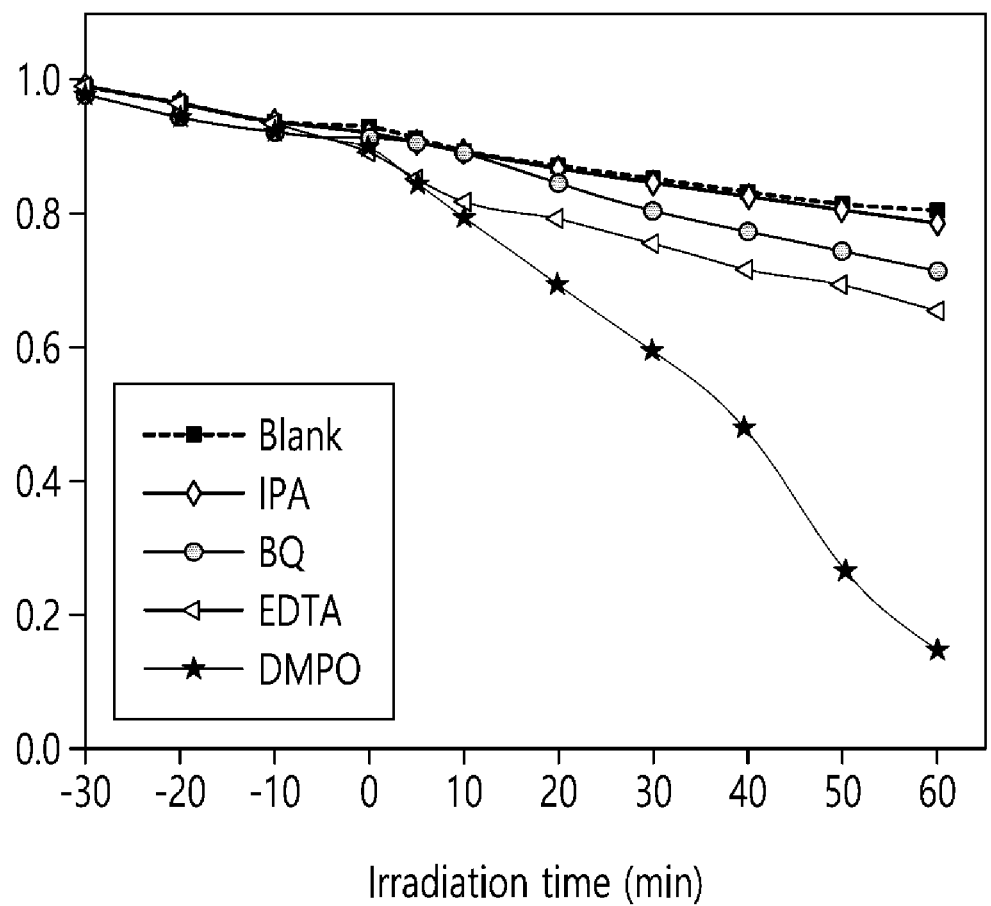

FIGS. 7A and 7B show a result of conducting experiment by adding a quencher (25±2° C., xenon lamp, lighting for 5 minutes).

It was confirmed that the degradation efficiency of MoS$_2$@MIL-88(Fe) was effectively improved by the addition of DMPO (·OH and ·O$_2^-$). The photodegradation efficiency of MB and RhB was decreased in the presence of the quencher as compared to the absence of the quencher. DMSO effectively increased the degradation efficiency of the two dye systems, followed by EDTA and BQ. Meanwhile, the IPA scavenger had no significant effect on the degradation efficiency of the two dyes, suggesting that active species such as ·OH and ·O$_2^-$ are predominant species involved in the degradation process.

2-2. Photocatalytic Degradation Performance

The photocatalytic behavior of the MoS$_2$, MIL-88(Fe) and MoS$_2$@MIL-88(Fe) catalysts was predicted by investigating the degradation of MB and RhB dyes. Specifically, a reaction mixture containing MB/RhB dye and MoS$_2$, MIL-88(Fe) or MoS$_2$@MIL-88(Fe) was stirred in the dark for 30 minutes with no light irradiation so that the adsorption equilibrium was reached for each dye. At the same time, the degradation rate of the two dyes were compared for 120 minutes in the absence of a photocatalyst. MB and RhB showed major absorption peaks at 665 and 554 nm in the UV-vis spectra.

Figure 8A:
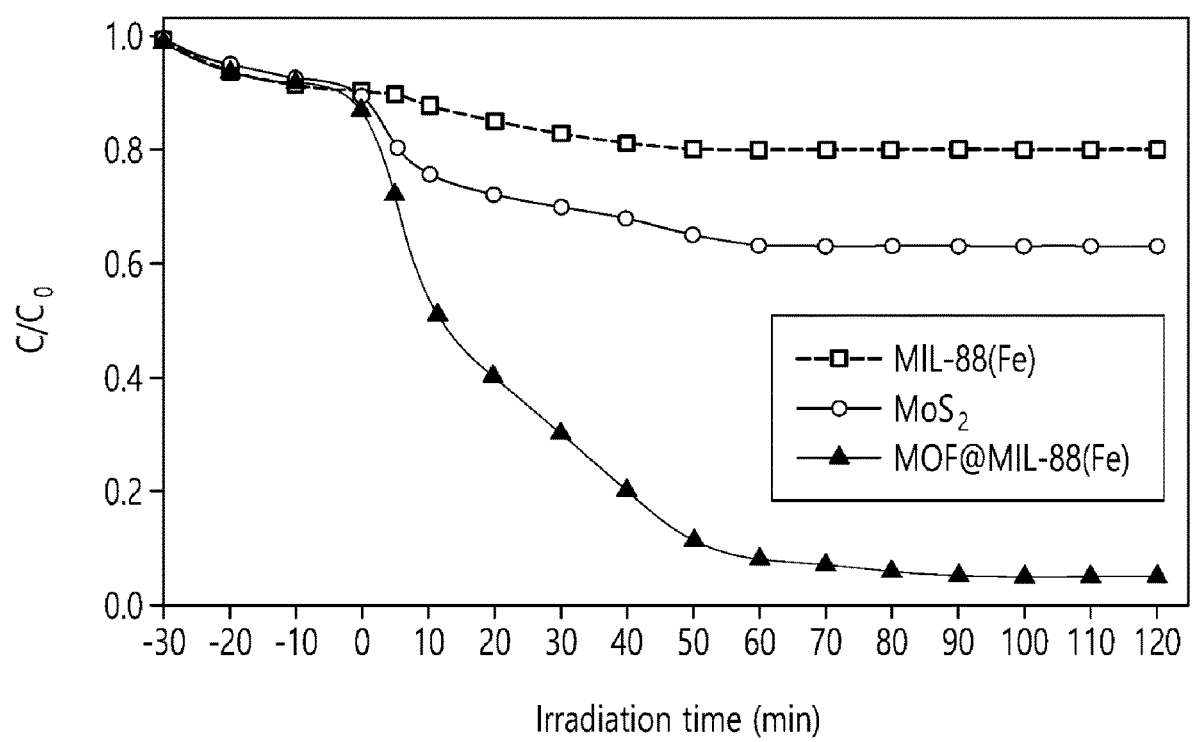
FIG. 8A and FIG. 8C show the photocatalytic performance of MB and RhB photodegradation systems using a $MoS_2$@MIL-88(Fe) sample of Example 3 according to the present disclosure.
Figure 8B:
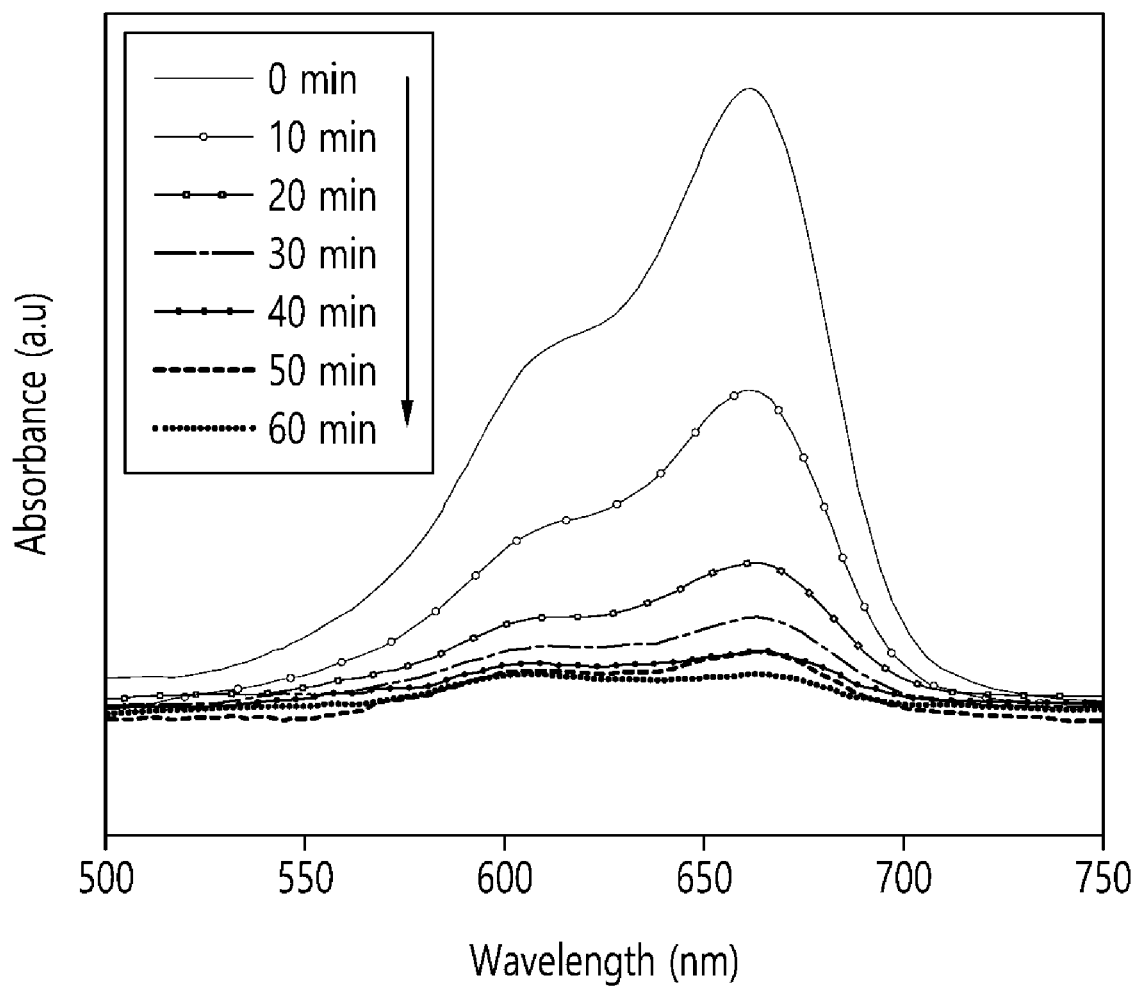
FIG. 8B and FIG. 8D show the UV-vis absorption spectra of MB and RhB photodegradation systems using a $MoS_2$@MIL-88(Fe) sample of Example 3 according to the present disclosure.
Figure 8C:
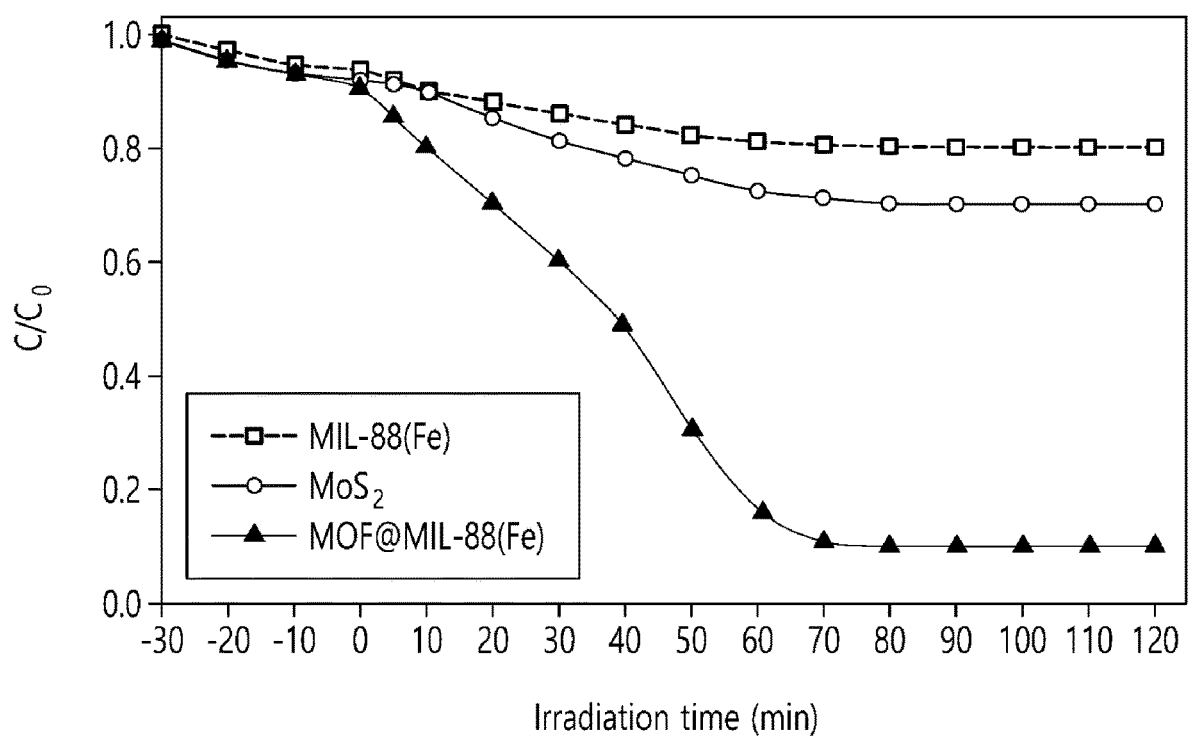

As shown in FIGS. 8A and 8C, the degradation ratio of the two dye was about 5% in the absence of the photocatalyst. After 60 minutes under optimized conditions, the MoS$_2$@MIL-88(Fe) catalyst showed the best catalytic efficiency under visible light irradiation from among MoS$_2$, MIL-88(Fe) and MoS$_2$@MIL-88(Fe).

Figure 8D:
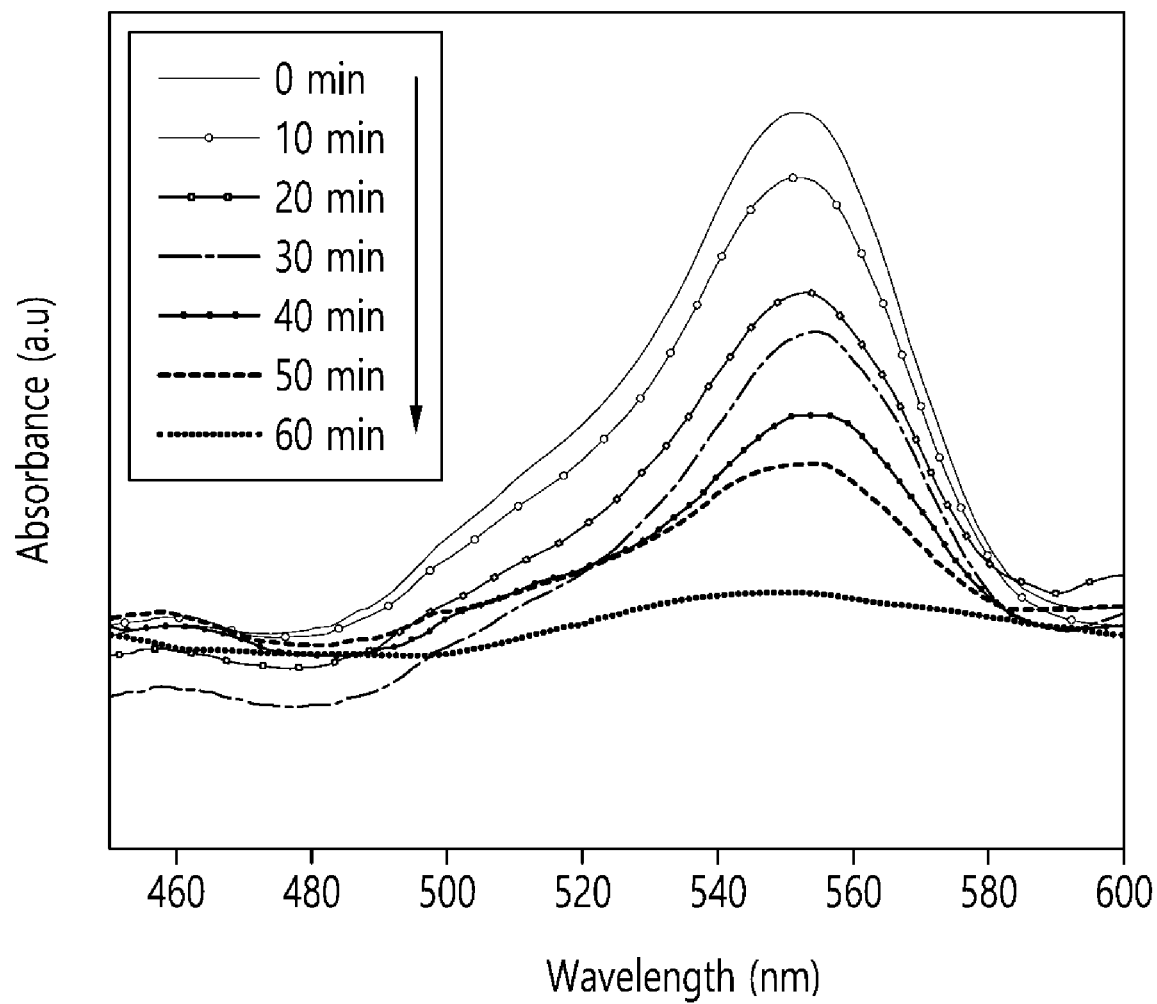

Also, as shown in FIGS. 8B and 8D, the absorption by the MB and RhB dyes decreased gradually.

2-3. Effect of Solution pH pH plays an important role in the degradation of organic dyes using a photocatalyst because of interfacial interactions between dye molecules and the photocatalyst depending on the surface charge of the photocatalyst and the ionic property of the dye. It is important to find the adequate pH range of the MoS$_2$@MIL-88(Fe) system in consideration of the pH range of industrial wastewater containing various dyes.

Figure 9A:
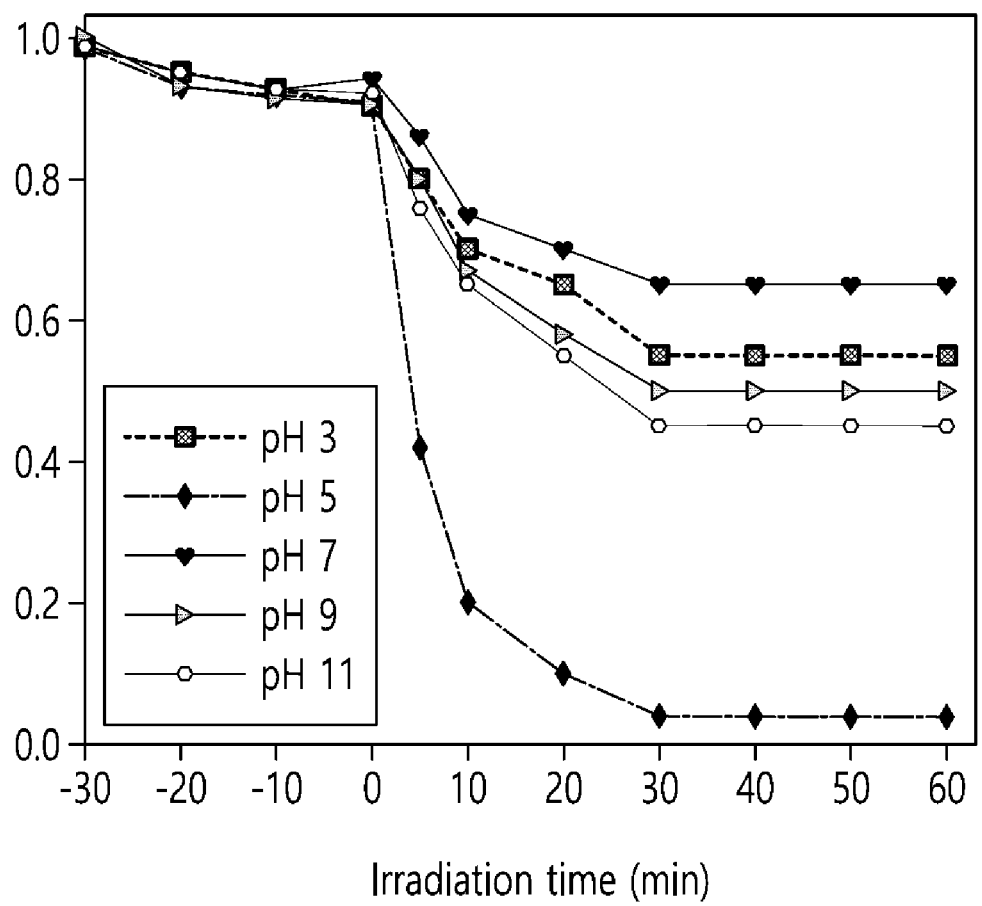
FIG. 9A and FIG. 9B show pH-dependent photocatalytic degradation in MB and RhB photodegradation systems using a $MoS_2$@MIL-88(Fe) sample of Example 3 according to the present disclosure.
Figure 9B:
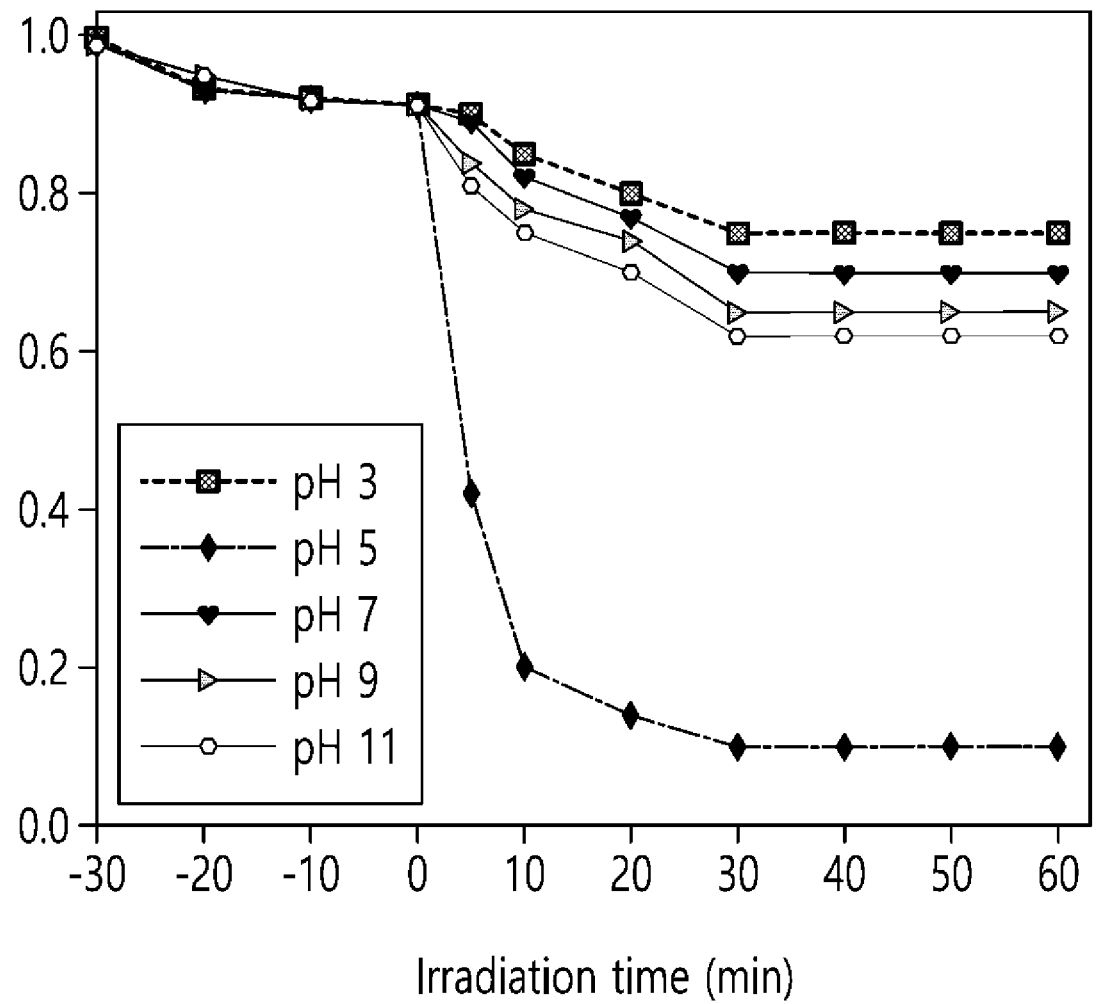

FIGS. 9A and 9B show the effect of pH on the photocatalytic degradation of MB and RhB under visible light irradiation under optimized experimental conditions (irradiation for 60 minutes, catalyst amount=100 mg, initial concentration=50 mg/L).

When the pH was increased to 5 or higher, the degradation efficiency of the two dyes was decreased due to the repulsion between the deprotonating groups of the two dyes and the negatively charged surface of the catalyst.

The decreased photocatalytic performance for RhB can be explained by the aggregation of amphiphilic ions, which forms larger molecules that cannot enter the pores of the catalyst. As can be seen from FIGS. 9A and 9B, the maximum degradation efficiency of MB at RhB was achieved at pH 5.0. In addition, the decreased photodegradation of the two dyes can be explained by the competition between the MoS$_2$@MIL-88(Fe) surface and the hydroxyl groups of the dyes that form OH radicals.

It should not be understood that the exemplary embodiments described above limit the technical idea of the present disclosure. The matter for which protection is sought in the present disclosure is limited by the appended claims only and those having ordinary knowledge in the art to which the present disclosure pertains can change and modify the present disclosure in various forms. It will be obvious to those having ordinary knowledge that such changes and modifications are included in the.

What is claimed is:

1. A visible light-reactive photocatalyst comprising:
   a metal-organic framework (MOF) having a porous structure, wherein the metal-organic framework is MIL-88 (Fe); and
   an active material doped on a surface of the metal-organic framework, wherein the active material is molybdenum disulfide (MoS$_2$),
   wherein a weight ratio of the metal-organic framework and the active material is in a range of 20:80 to 40:60.

2. The visible light-reactive photocatalyst according to claim 1, wherein the active material and the metal-organic framework have a (p-n) heterojunction.

3. The visible light-reactive photocatalyst according to claim 1, wherein the visible light-reactive photocatalyst has a band gap energy of 2.70-2.80 eV.

4. The visible light-reactive photocatalyst according to claim 1, wherein the visible light-reactive photocatalyst facilitates photodegradation reaction of an organic material comprising one or more of methylene blue (MB) and rhodamine B (RhB).

5. The visible light-reactive photocatalyst according to claim 1, wherein the visible light-reactive photocatalyst facilitates photodegradation reaction of an organic material at pH 4.5-5.5.

* * * * *